United States Patent [19]

Plumer

[11] Patent Number: 4,898,429

[45] Date of Patent: Feb. 6, 1990

[54] WHEEL NUT ASSEMBLY

[76] Inventor: Mark J. Plumer, 10660 Wilshire Blvd. Apt. 1106, Los Angeles, Calif. 90024

[21] Appl. No.: 222,668

[22] Filed: Jul. 25, 1988

[51] Int. Cl.$^4$ .................................................. B60B 3/16
[52] U.S. Cl. ................................... 301/9 DN; 301/65; 411/368; 411/533
[58] Field of Search ............... 301/9 DN, 9 AN, 5 R, 301/63 PW, 65; 411/368, 369, 432, 533, 534

[56] References Cited

U.S. PATENT DOCUMENTS

| 765,139 | 7/1904 | Hirsch | 411/368 |
|---|---|---|---|
| 1,356,404 | 10/1920 | Robinson | 411/546 |
| 3,329,468 | 7/1967 | Beith | 301/9 DN |
| 3,811,737 | 5/1974 | Lejeune | 301/63 PW |
| 4,238,165 | 12/1980 | Wagner | 403/408 |
| 4,296,586 | 10/1981 | Heurteux | 52/787 |
| 4,310,273 | 1/1982 | Kirrish | 411/338 |
| 4,435,112 | 3/1984 | Becker | 411/368 |
| 4,478,532 | 10/1984 | Puro | 403/157 |
| 4,679,860 | 7/1987 | Koishi et al. | 301/9 DN |
| 4,708,397 | 11/1987 | Weinmann | 301/9 DN |

FOREIGN PATENT DOCUMENTS

| 613808 | 9/1926 | France | 301/9 DN |
|---|---|---|---|
| 839409 | 4/1939 | France | 301/9 DN |
| 579294 | 7/1958 | Italy | 301/9 DN |
| 0195402 | 11/1984 | Japan | 301/63 PW |
| 0197401 | 10/1985 | Japan | 301/9 DN |

Primary Examiner—Russell D. Stormer
Attorney, Agent, or Firm—Robert J. Schaap

[57] ABSTRACT

A wheel nut assembly for mounting a non-ferrous wheel, such as a magnesium or aluminum wheel to a wheel hub. The wheel typically has a plurality of openings to receive nut assemblies and each opening has a first section with a first diameter distal to the hub and a second section with a reduced diameter proxmate to the hub along with tapered section extending therebetween. The nut assembly comprises a body section having a plurality of peripherally extending tool engaging walls and with a bore extending through the body section. A skirt is located on the nut body and extends axially with the bore outwardly from the tool engaging walls. An insert formed of a ferrous material is used with the nut and is adapted to extend around the skirt and a portion of the body. The insert has a central opening sized to receive the skirt and an outer wall of the insert is adapted to engage an opening in the wheel. In accordance with this construction, the wheel nut can be tightened about a mounting bore extending from the hub without the risk of crushing or bending the non-ferrous wheel.

20 Claims, 1 Drawing Sheet

WHEEL NUT ASSEMBLY

BACKGROUND OF THE INVENTION

1. Field of the Invention

This invention relates in general to certain new and useful improvements in wheel nut assemblies and means and method for mounting a non-ferrous wheel to a hub of a vehicle, and more particularly, to a wheel nut assembly and a means and method for mounting a non-ferrous wheel to a hub which utilizes a nut with a skirt and an insert extending between an opening in the wheel and surrounding the body of the nut and the skirt thereon.

2. Brief Description of the Prior Art

In recent years, automobile manufacturers have resorted to the production of non-ferrous wheels for motor vehicles and particularly, wheels made of aluminum and magnesium. In addition, wheels which are made of non-ferrous materials are frequently offered in the automotive aftermarket or so-called "secondary market" for purposes of customizing a vehicle. As a result of their light weight, non-ferrous wheels have been used frequently in racing vehicles and have thereby become popularized. Accordingly, many automotive enthusiasts will therefore substitute these non-ferrous wheels for the conventionally provided steel vehicle wheel.

Several problems have been encountered when attempting to mount a non-ferrous wheel to the hub of a vehicle. Generally, the hub is formed of steel and the lug nuts used to secure the wheel to the hub are also formed of steel. When using the conventional lug nut, portions of the wheel surrounding the bolt holes, which receive the bolt stem or so-called "stud" extending from the hub, are effectively compressed between the lug nut and the hub. Inasmuch as the nut and the hub are formed of a much harder material than the non-ferrous wheel, they effectively bend and crush portions of the softer non-ferrous metal wheel. Accordingly, the user of the non-ferrous wheel had to exercise special care when tightening the lug nut onto the bolt stem extending from the hub in order to preclude damage to the wheel. Moreover, this concern causes the user to exercise caution and the user often fails to tighten the lug nuts with the requisite amount of torque to obtain a safe mounting of the wheel.

In addition to the above, in order to tighten the lug nut against the wheel with the requisite amount of force, the aluminum wheel had to have sufficient thickness in the region of the bolt receiving holes in order to accommodate the compressive force which is imposed on the wheel. If there was not sufficient thickness of metal forming the wheel and surrounding the hole, then the wheel could be easily crushed or bent. However, generally all hub studs are of a standard length. Moreover, that length is established for the mounting of steel wheel onto the hub using steel lug nuts. As a result, when there is an increased thickness in the wheel in the region surrounding the holes which receive the hub stems, there is less threaded length of the stud available for engagement by the lug nut. As a simple example, where the conventional stud is ¾ inches long, if the wheel was made with a thickness of ½ inch, in the region of the holes receiving the studs, then there would only be about ¼ inch or less remaining for securement of the lug nut.

This problem of insufficient tightening length of the wheel stud available for a lug nut has created several problems. First of all, there is not sufficient gripping length of the stud available in order to obtain effective tightening action of the wheel lug nut with the required amount of force. Moreover, due to the fact that the lug nut is not securely tightened onto the hub stud, there is a tendency for the wheel nut to vibrate and become loosened from its position on the threaded stud. This condition creates the obvious danger of the wheel becoming loosened from the wheel hub during movement of the vehicle.

OBJECTS OF THE INVENTION

It is, therefore, one of the primary objects of the present invention to provide a lug nut assembly which enables the mounting of a non-ferrous wheel to the hub of a vehicle and which utilizes a skirted lug nut and an insert adapted for surrounding disposition about the skirted nut.

It is another object of the present invention to provide a lug nut assembly of the type stated which permits tightening of the wheel against the hub without any substantial risk of damaging the wheel.

It is a further object of the present invention to provide a lug nut assembly which enables the tightening of the wheel onto the hub of a vehicle with the desired amount of force in order to obtain a positive and secure mounting of a non-ferrous wheel onto the vehicle hub.

It is an additional object of the present invention to provide a lug nut assembly of the type stated which can be used with a wide variety of vehicles produced by various manufacturers thereof.

It is another salient object of the present invention to provide a lug nut assembly of the type stated which is highly effective in use and which can be manufactured at a relatively low cost.

With the above and other objects in view, my invention resides in the novel features of form, construction, arrangement and combination of parts presently described and pointed out in the claims.

BRIEF SUMMARY OF THE INVENTION

A wheel nut assembly for mounting of a non-ferrous wheel to a wheel hub and which hub is typically formed of a steel material. The assembly comprises a lug nut having a body section with a plurality of peripheraly extending tool engaging walls. This body section also has a central bore extending therethrough. The tool engaging walls are preferably flat surfaces, such as hexagonally arranged surfaces adapted to be received by the socket of a wrench.

A skirt is located on the nut and extends axially with the bore outwardly from the tool engaging walls. The skirt is preferably integrally formed with the body of the nut itself. Moreover, the skirt also has a cental bore in alignment with the central bore of the body and is sized to receive a stud extending outwardly from the hub of the vehicle.

The wheel nut assembly of the present invention also comprises an insert formed of a ferrous material and which is adapted to extend around a portion of the skirt. The insert is also provided with a central opening to receive the skirt. The ferrous insert further has an outer wall which is adapted to engage the opening in the wheel. In a more preferred embodiment, the ferrous insert also engages a portion of the body of the lug nut as well as the skirt of the lug nut. The insert is centrally opened and has an interior shape in the central opening to conform to and snuggly engage both the skirt and a portion of the body of the lug nut.

In accordance with the above identified construction, the insert surrounds the lug nut and since it does not have any relatively sharp corners the forces imposed on the insert by the lug nut are distributed throughout the surface of the insert. As a result, the lug nut can be tightened with a substantial amount of force against the insert which, in turn, bears against the softer aluminium wheel. This construction utilizing a skirt on the lug nut and which is surrounded by the insert enables the lug nut to engage a substantial portion of the length of the lug nut. This construction thereby eliminates the tendency of the lug nut to vibrationally unwind on the shank of the stud extending from the wheel hub.

This invention possesses many other advantages and has other purposes which may be made more clearly apparent from a consideration of the forms in which it may be embodied. One of the preferred forms in the invention is more fully described in the following detailed description of the invention. However, it is understood that such detailed description is not to be taken in a limiting sense and is only illustrative of one of the preferred embodiments of the present invention.

BRIEF DESCRIPTION OF THE DRAWINGS

Figure 1:
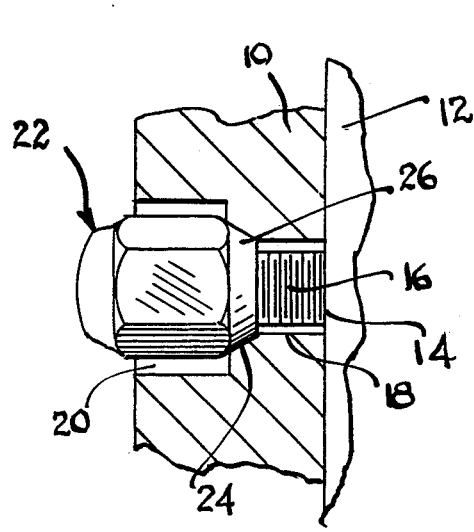
Figure 3:
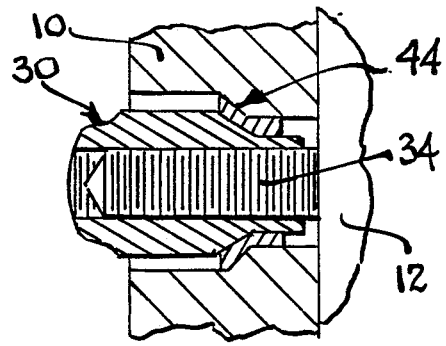
Figure 2:
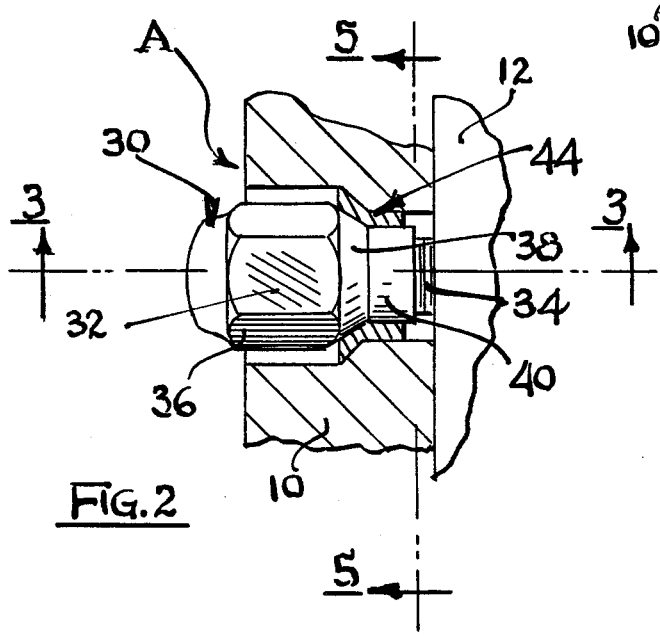
Figure 4:
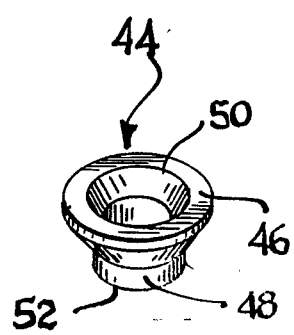
Figure 5:
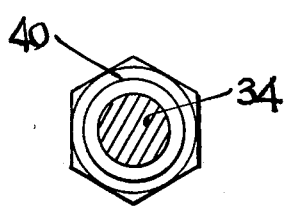

Having thus described the invention in general terms, reference will now be made to the accompanying drawings (two sheets) in which:

FIG. 1 is a side elevational view, partially broken away and in section, and showing a prior art mounting arrangement utilizing a steel nut bearing against an aluminum wheel;

FIG. 2 is a side elevational view, partially broken away and in section, showing a lug nut assembly for mounting an aluminum wheel to a vehicle hub in accordance with the present invention;

FIG. 3 is a vertical sectional view taken along line 3—3 of FIG. 2;

FIG. 4 is a perspective view showing a portion of an insert used in the lug nut assembly of the present invention;

FIG. 5 is a horizontal sectional view taken along line 4—4 of FIG. 2; and

Figure 6:
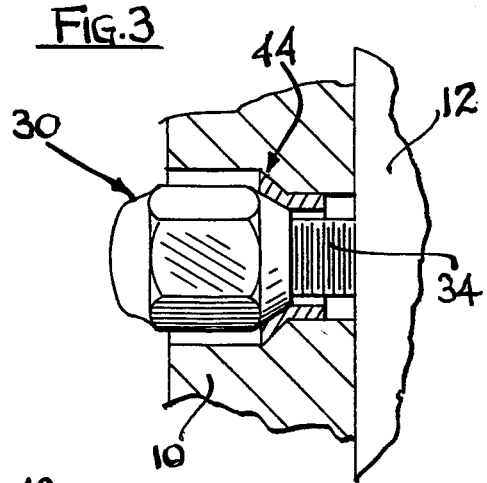

FIG. 6 is a side elevational view, partially broken away and in section and showing an arrangement where a lug nut assembly does not provide for proper gripping action on the stud of a wheel.

DETAILED DESCRIPTION OF A PREFERRED EMBODIMENT

Referring now in more detail and by reference characters to the drawings which illustrate a preferred embodiment of the present invention, FIG. 1 illustrates a conventional prior art arrangement for mounting an aluminum wheel, or other non-ferrous wheel, 10 to a hub 12 of a vehicle. The hub 12 is generally secured to and extends circumferentially around the axle of the vehicle and is adapted to receive any conventional wheel.

The plurality of threaded studs 14 (usually four to eight threaded studs) are circumferentially spaced about and extend outwardly from a flat surface of the vehicle hub. One of those studs 14 is more fully illustrated in FIG. 1 of the drawings and extends outwardly from a flat surface of the hub 12. Moreover the hub stud 14 is provided with an externally threaded section 16.

The conventional vehicle wheel, such as the aluminum wheel 10, is provided with a plurality of bolt holes 18, having cylindrically shaped regions which are sized and arranged to receive the outwardly extending studs on the vehicle hub 14. Moreover, the bolt holes 18 extend into and communicate with large nut receiving recesses 20 formed within the vehicle wheel 10 for receiving conventional lug nuts 22. A frustoconically shaped tapered wall 24 (a conically shaped region) extends between the recess 20 and the bolt hole 18, in the manner as illustrated in FIG. 1 of the drawings, in order to receive and to be engaged by a bearing surface 26 on a conventional lug nut 22.

In accordance with the above identified construction, a non-ferrous vehicle wheel may be mounted to the hub 12 of the vehicle by locating the various studs 14 in the bolt holes 18 of the wheel. Thereafter, the wheel is secured to the hub of the vehicle by tightening the lug nuts 22 on the externally threaded section 16 of each of the studs 14. In accordance with this prior art arrangement, the bearing surfaces 26 of the lug nuts will engage and bear against the frustoconical outwardly flaring surface 24 of the non-ferrous wheel 10.

As indicated previously, most conventional vehicles are constructed so as to receive steel wheels. When a steel wheel is mounted to the studs extending outwardly from the hub, there is generally no problem in providing a security fit and tight locking arrangement of the wheel on the vehicle hub. However, and as indicated previously, several problems do arise when attempting to mount a non-ferrous wheel to a vehicle hub.

Due to the fact that an aluminum or magnesium wheel is much softer than a steel wheel, and also due to the fact that it does not have the same inherent strength and rigidity, the aluminum wheel and the magnesium wheel often have thicker wall constructions in order to compensate for the lack of strength requirements which are inherent in the steel wheel. As a result, the lug nuts 22 are not capable of being tightened around the greater portion of the threaded section 16 of the length of the stud 14. FIG. 1 illustrates a problem which arises when a wheel of thicker sidewall than a steel wheel is mounted on a vehicle hub. It can be observed that the conventional lug nut engages the outwardly flaring frustoconical surface 24 at an appreciable distance from the face of the hub 12. Accordingly, only a few threads of the stud 14 are engaged by the lug nut 22.

As a result of the fact that there is not a tight securement of the lug nut on the stud, vibrational forces which inevitably arise during movement of the vehicle will cause the lug nut 22 to unwind on the shank of the stud 14. Furthermore, the unsupported length of the stud allows the stud to flex during rotation of the wheel and this, in turn, causes the nut to dig into the soft aluminum face and become loosened from the stud.

FIGS. 2 through 5 illustrate a lug nut assembly A used for securing an aluminum wheel or other non-ferrous wheel 10 to the studs 14 extending outwardly from the vehicle hub 12. The lug nut assembly A of the present invention generally comprises a lug nut 30 having a central body section 32 with an internally threaded cylindrical bore 34 extending therethrough. The body section 32 is provided with a plurality of tool engaging circumferentially arranged relatively flat surfaces 36 often referred to as tool engaging walls, which are located to receive the socket or flats of a conventional wrench.

At its inner end, that is the end facing the hub 12 of the vehicle, reference being made to FIG. 2, the body section 32 integrally merges into a tapered bearing face 38 which is sized to normally engage and bear against the frustoconical wall 24 in the conventional aluminum wheel or magnesium wheel. The tapered bearing wall 38 also integrally merges into an inwardly extending cylindrically shaped skirt 40 which is also integral with the body 32 of the lug nut. The skirt 40 is also provided with the internally threaded central bore sized to receive the externally threaded stud 14 on the hub 12 of the vehicle.

The lug nut assembly of the present invention is also provided with an insert 34 which is also formed of a ferrous material such as steel and which is also best illustrated in FIG. 4 of the drawings. It can be observed that the insert 44 comprises a conically shaped section in the form of an inwardly tapering head 46 which integrally merges into a cylindrically shaped section, such as a sleeve 48. The head 46 is provided with a conically shaped opening 50 generally conforming to the exterior shape of the head 46, in the manner as best illustrated in FIGS. 3 and 4 of the drawings. In like manner, the sleeve 48 is provided with a central bore 52 communicating with the opening 50. In this way, it can be seen that the insert has a conically shaped inner wall bearing against the conically shaped section on the body of the nut and a conically shaped outer wall bearing against the conically shaped region of the wheel. In like manner, the insert also has a cylindrically shaped inner wall section bearing against a substantial portion of the axial length of the skirt and also a cylindrically shaped outer wall bearing against the cylindrically shaped region of the wheel.

By further reference to FIG. 2, it can be observed that the insert 44 is adapted to fit snugly about the bearing wall 38 of the lug nut 30 and the skirt 40 of the lug nut. More specifically, it can be observed that the head 46 of the insert engages the bearing surface 38 and the sleeve 48 of the insert 44 snugly engages the skirt 40 on the lug nut. In addition, the exterior face of the head 46 of the insert engages the frustoconical surface 24 formed in the vehicle wheel and the exterior face of the sleeve 48 bears against the cylindrically shaped bore of the bolt hole formed in the vehicle wheel.

In accordance with the construction utilizing the nut lug assembly of the present invention, it can be observed that the lug nut can be tightly engaged against the steel insert 44 Moreover, the insert 44 generally conforms to and will bear against the surface of the aluminum or magnesium wheel surrounding the bolt hole. Inasmuch as the insert generally conforms to the surface of the material surrounding the bolt hole, there is a generally even distribution of forces. As a result, the insert does not bite into or otherwise distort the softer aluminum or magnesium wall. Furthermore, the skirt on the lug nut bears against the cylindrically shaped sleeve on the insert and in this way, the sleeve on the insert is captured between the skirt of the lug nut and the bore of the bolt hole formed in the wheel.

FIG. 6 illustrates the very undesirable situation which could arise if the insert were used with a lug nut which did not have a skirted portion thereon. In FIG. 6, it can be observed that while the steel cylindrically shaped sleeve bears against the surface of the material surrounding the bolt hole, there is no skirt portion or other material which provides rigidity to the vehicle stud. Accordingly, there is insufficient gripping of the lug nut on the vehicle stud.

Thus it has been established that a lug nut must engage at least a length of stud equivalent to at least one times the thread diameter for at least a minimum desired threaded engagement. The prior art lug nut arrangements used for mounting the aluminum and magnesium wheels did not afford this protection. However, the lug nut assembly of the present invention is more than adequate in meeting this minimum requirement. The lug nut arrangement of the present invention has been installed and tested on over 300,000 wheels and there has not been any one reported failure of a lug nut loosening or any other type of failure.

Thus, there has been illustrated and described a unique and novel lug nut assemby for securing a non-ferrous wheel to a hub of a vehicle and which utilizes a skirted lug nut and a ferrous insert therefore. Thus, the present invention fulfills all of the objects and advantages which have been sought therefore. It should be understood that many changes, modifications, variations, and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention which is limited only by the following claims.

Having thus described the invention, what I desire to claim and secure by Letters Patent is:

1. A wheel nut assembly for mounting a non-ferrous wheel to a wheel hub and securing the wheel to a plurality of outwardly extending studs through holes in the wheel and which holes, each have a conically shaped region and a connecting cylindrically shaped region and where the wheel hub has a hardness substantially greater than the wheel, said assembly comprising:
   (a) a lug nut having a body with a plurality of peripherally extending tool engaging walls and with a bore extending therethrough,
   (b) a conically shaped section on said body, said conically shaped section having an end proximate said body and an end distal to said body and a tapered outer wall which converges towards a reduced diameter at the end distal to said body,
   (c) a skirt connected to the distal end of said conically shaped section and extending outwardly from said tool engaging walls axially with said bore, said skirt and conically shaped section having a bore communicating with the bore of the body and being sized to receive a mounting stud extending from said wheel hub, and
   (d) an insert formed of a ferrous material and adapted to extend around said skirt, said insert having a hardness similar to that of said hub and substantially greater than said wheel, said insert having a central opening sized and shaped to receive said conically shaped section on said body and said skirt, said insert also having a conically shaped inner wall bearing against the conically shaped section on said body and a conically shaped outer wall bearing against the conically shaped region of said wheel, said insert further having a cylindrically shaped section integral with the conically shaped section of the insert sized to receive the skirt on the nut and extending along and bearing against a substantial portion of the axial length of the skirt on said nut, the cylindrically shaped section of said insert also bearing against the cylindrically shaped region of said wheel, so that the nut may be tightened on the stud without crushing the wheel or damaging the stud and so that the nut and sleeve in combination grip a sufficient length of stud to preclude a vibrational unwinding from the stud and reducing flexing of the stud and damaging of stud receiving holes in the wheel.

2. The wheel nut assembly of claim 1 further characterized in that the walls of the body section are parallel to a central axis of the bore.

3. The wheel nut assembly of claim 2 further characterized in that the skirt is cylindrically shaped and the central axis of the skirt is coincident with the central axis of the bore.

4. The wheel nut assembly of claim 3 further characterized in that said cylindrically shaped section of said insert has a cylindrically shaped interior wall which also extends around and bears against a portion of the skirt on the body of the nut when in use.

5. The wheel nut assembly of claim 1 further characterized in that said conically shaped section on said body has approximately the same angle of taper as the conically shaped inner wall of said insert to conform to and to be received by said insert.

6. The wheel nut assembly of claim 5 further characterized in that the conically shaped outer wall of said insert has the same angle of taper as a conically shaped region of the wheel to engage and be received by the opening in said wheel.

7. The wheel nut assembly of claim 1 further characterized in that the cylindrically shaped section of the insert has an outer diameter sized to snugly bear against the cylindrically shaped region of a hole in the wheel and an inner diameter sized to snugly receive and bear against the skirt on the nut to thereby provide a body bound condition.

8. A wheel nut assembly for mounting a non-ferrous wheel to a wheel hub and where the wheel hub has a hardness substantially greater than the wheel, said wheel having a plurality of openings to receive nut assemblies and each opening having a first region with a first diameter distal to the hub and a second region with a reduced diameter proximate to the hub and a tapered region having a conically shaped wall which converges inwardly toward said hub and extending between the first and second regions, said wheel nut assembly comprising:
(a) a lug nut having a body,
(b) a conically shaped section on said body, said conically shaped section having an end proximate said body and an end distal to said body and a tapered outer wall which converges towards a reduced diameter at the end distal to said body,
(c) a portion of the body being sized and shaped for disposition in the first region of the opening,
(d) a skirt extending from said body, said skirt being located and adapted for disposition in the second region of the opening,
(e) the conically shaped section of the body being sized and shaped and located for disposition in the third region of the opening, and
(f) an insert formed of a material having a hardness somewhat similar to that of said hub and substantially greater than said wheel located around a portion of said lug nut, said insert having a first portion with a conically shaped inner wall bearing against the conically shaped section on said body and a conically shaped outer wall bearing against the conically shaped third region of said wheel, said insert also having a second portion integral with the conically shaped section of the insert and sized to receive the skirt of the nut and extending along and bearing against a substantial portion of the length of the skirt on said nut, and against the second region of the wheel, so that the nut may be tightened on the stud without crushing the wheel or damaging the stud and so that the nut and sleeve in combination grip a sufficient length of a stud to preclude a vibrational unwinding from the stud and reduce a flexing of the stud and damaging of stud receiving holes in the wheel.

9. The wheel nut assembly of claim 8 further characterized in that said second portion of said insert is cylindrically shaped and is integral with said first portion of said insert.

10. The wheel nut assembly of claim 9 further characterized in that said body and said skirt have aligned central bores and the walls of the body section are parallel to a central axis of the bore.

11. The wheel nut assembly of claim 8 further characterized in that the cylindrically shaped section of the insert has an outer diameter sized to snugly bear against the cylindrically shaped region of an opening in the wheel and an inner diameter sized to snugly receive and bear against the skirt on the nut to thereby provide a body bound condition.

12. The wheel nut assembly of claim 9 further characterized in that said insert is formed of a ferrous material.

13. The wheel nut assembly of claim 8 further characterized in that the tapered third region of the opening is relatively short in the axial dimension compared to the first and second regions of the opening, the conically shaped section on the body adapted for disposition in the third region of the opening having a relating short axial dimension compared to the remainder of the body.

14. An assembly of a vehicle wheel steel hub having a nonferrous wheel mounted thereto, said assembly comprising:
(a) a steel hub plate,
(b) a plurality of threaded studs extending outwardly from said hub plate,
(c) a non-ferrous wheel having a plurality of stud receiving holes aligned to receive respective ones of the studs and said holes each having a conically shaped region and a connected cylindrically shaped region,
(d) a steel lug nut having a body threadedly secured to each of said studs,
(e) an outwardly extending conically shaped section on each said body, each said conically shaped section having an end at said body and an end distal to said body and facing said hub plate and a tapered outer wall which converges towards a reduced diameter at the end distal to said body, the conically shaped section also having a central bore,
(f) a steel skirt extending from the conically shaped section on each said lug nut and projecting toward said hub plate, each said skirt also having a bore to receive the stud, and
(g) a steel insert extended about each said skirt and the conically shaped section on each body of the associated lug nut, each said insert having a central opening sized to receive the skirt and a portion of the conically shaped section on the body of each lug nut, thereby forming a conically shaped inner wall bearing against the conically shaped section on said body, each said insert also having a conically shaped outer wall bearing against a conically shaped region of the opening in said wheel, each said insert also having a cylindrically shaped section integral with the conically shaped section of the insert and bearing against the skirt on said nut, said insert also having an exterior wall engaging the cylindrically shaped region of the holes in the nonferrous wheel.

15. The assembly of claim 14 further characterized in that the central axis of the bore of the skirt is coincident with the central axis of the bore of the conically shaped section and each of the bores are internally threaded.

16. The wheel nut assembly of claim 14 further characterized in that the cylindrically shaped section of the insert has an outer diameter sized to snugly bear against the cylindrically shaped region of an opening in the wheel and an inner diameter sized to snugly receive and bear against the skirt on the nut to thereby provide a body bound condition.

17. An improvement for use in the mounting of a non-ferrous wheel to a wheel hub having a hardness substantially greater than that of the wheel and where a plurality of threaded studs extend outwardly from the hub into and through respective ones of a plurality of openings in the wheel and where lug nuts are used to secure the wheel to the hub, the openings in the wheel each having a conically shaped region which diverges outwardly at a side of the wheel distal to the hub and a connected cylindrically shaped region, and each of the lug nuts being characterized in that they each comprise a body with an internally threaded bore for threaded engagement with the threaded studs, an outwardly extending conically shaped section on said body of each lug nut, each said conically shaped section having an end proximate said body and an end distal to body and a tapered outer wall which converges towards a reduced diameter at the end distal to said body, a hollow skirt integral with the conically shaped section on each of said bodies and extending outwardly from each said body toward one of the openings in said wheel and each said skirt also having a central threaded bore sized to receive a threaded stud; the improvement comprising an insert for use with each of said lug nuts and associated skirts and which inserts are formed of a material of hardness similar to that of the hub and substantially greater than that of the wheel, each said insert comprising a body having a cylindrically shaped shank and an integral outwardly flaring conically shaped head with a central bore extending therethrough and which insert extends about a portion of the conically shaped section on the body of the lug nut and a portion of the associated skirt when in use, said head of each said insert having a conically shaped inner wall in said bore bearing against the conically shaped region on said body of a nut and a conically shaped outer wall bearing against the conically shaped region of said wheel, said insert also having the cylindrically shaped shank integral with the conically shaped section of the insert and having a cylindrically shaped interior wall in said bore bearing against a substantial portion of the axial length of the skirt on said nut and also having a cylindrically shaped exterior wall bearing against the cylindrically shaped region of the wheel whereby a substantial length of the studs can be gripped by the nut and skirt and with the insert of a harder material than said wheel bearing against the openings in the wheel, so that the nut may be tightened on the stud without rushing or bending the wheel and so that the nut and sleeve in combination grip a sufficient length of a stud to preclude a vibrational unwinding from the stud.

18. The wheel nut assembly of claim 17 further characterized in that said insert is formed of a ferrous material.

19. The improvement of claim 17 further characterized in that the lug nut has a plurality of peripherally extending tool engaging walls on the body which are parallel to a central axis of the bore, and where the insert does not extend up to or engage such tool engaging walls.

20. The improvement of claim 17 further characterized in that the shaped interior wall of the insert bears snugly against the skirt on the nut and the cylindrically shaped exterior wall bears snugly against the cylindrically shaped region of the wheel to thereby provide a body bound condition.

* * * * *